(12) United States Patent
Gorgone et al.

(10) Patent No.: US 7,137,121 B2
(45) Date of Patent: Nov. 14, 2006

(54) DATA-PROCESSING CIRCUIT AND METHOD FOR SWITCHING BETWEEN APPLICATION PROGRAMS WITHOUT AN OPERATING SYSTEM

(75) Inventors: Peter S. Gorgone, Seattle, WA (US); Evan Cheng, Sammamish, WA (US); Inga Stotland, Seattle, WA (US)

(73) Assignee: Equator Technologies, Inc., Campbell, CA (US)

( * ) Notice: Subject to any disclaimer, the term of this patent is extended or adjusted under 35 U.S.C. 154(b) by 755 days.

(21) Appl. No.: 10/126,353

(22) Filed: Apr. 19, 2002

(65) Prior Publication Data

US 2003/0200249 A1 Oct. 23, 2003

(51) Int. Cl.
*G06F 9/48* (2006.01)
(52) U.S. Cl. .................. 718/108; 718/107; 712/228; 712/31; 712/34
(58) Field of Classification Search ............. 709/215, 709/223, 229; 711/147, 148, 173; 718/100–108; 712/1–300
See application file for complete search history.

(56) References Cited

U.S. PATENT DOCUMENTS

| | | | | |
|---|---|---|---|---|
| 4,729,094 A | * | 3/1988 | Zolnowsky et al. | 712/34 |
| 4,847,751 A | * | 7/1989 | Nakade et al. | 718/107 |
| 5,483,647 A | * | 1/1996 | Yu et al. | 713/100 |
| 5,495,606 A | * | 2/1996 | Borden et al. | 707/3 |
| 5,537,548 A | * | 7/1996 | Fin et al. | 709/204 |
| 5,794,037 A | * | 8/1998 | Young | 718/108 |
| 5,812,843 A | * | 9/1998 | Yamazaki et al. | 718/100 |
| 6,061,711 A | * | 5/2000 | Song et al. | 718/108 |
| 6,381,682 B1 | * | 4/2002 | Noel et al. | 711/153 |
| 6,507,293 B1 | | 1/2003 | Deeley et al. | |
| 6,571,137 B1 | * | 5/2003 | Muller | 700/71 |
| 6,631,394 B1 | * | 10/2003 | Ronkka et al. | 718/100 |
| 6,711,605 B1 | * | 3/2004 | Sekiguchi et al. | 718/100 |
| 6,742,104 B1 | * | 5/2004 | Chauvel et al. | 711/207 |

(Continued)

OTHER PUBLICATIONS

Solsana, Francesc et al. "Implementing Explicit and Implicit Coscheduling in a PVM Environment." Euro-Par 2000—Parallel Processing: 6th International Euro-Par Converence, Munich, Germany, Aug./Sep. 2000.*

(Continued)

*Primary Examiner*—Lewis A. Bullock, Jr.
(74) *Attorney, Agent, or Firm*—Marger Johnson & McCollom P.C.

(57) ABSTRACT

A data-processing circuit includes first and second cooperating processors where one of the processors context switches between applications without running an operating system. In one implementation, the first processor operates under the control of an operating system to switch back and forth between executing a first application or portion thereof and executing a second application or portion thereof. And the second processor operates in a stand-alone mode to switch back and forth between the first application or a portion thereof and the second application or a portion thereof. In another implementation, the first processor runs a single application or portion thereof but no operating system, and the second processor operates in a stand-alone mode to switch back and forth between different applications or different portions of the same or different applications. Such a data-processing circuit allows multiple processors to run multiple applications and/or portions thereof "simultaneously" while at least one of the processors is operating in a stand-alone mode to reduce or eliminate operating-system overhead.

35 Claims, 4 Drawing Sheets

U.S. PATENT DOCUMENTS 6,763,458 B1 * 7/2004 Watanabe et al. ............ 713/100
6,772,419 B1 * 8/2004 Sekiguchi et al. ........... 719/319
6,842,857 B1 * 1/2005 Lee et al. ....................... 713/2

OTHER PUBLICATIONS

Sahni, Sartaj. "Scheduling Master-Slave Multiprocessor Systems." IEEE. Oct. 1996.*

Ghormley, Douglas P. et al. "GLUnix: a Global Layer Unix for a Network of Workstations." Jun. 1, 1998.*

Yue, Kelvin K. et al. "Dynamic Processor Allocation with the Solaris Operating System." 1998.*

Liu, Xin et al. "Coscheudling on Cluster Systems." 1998.*

Yue, Kelvin K. et al. "An Effective Processor Allocation Strategy for Muliprogrammed Shared-Memory Multiprocessors." IEEE. Dec. 1997.*

Feitelson, Dror G. et al. "Coscheduling Based on Run-time Identification of Activity Working Sets." Oct. 1992.*

* cited by examiner

DATA-PROCESSING CIRCUIT AND METHOD FOR SWITCHING BETWEEN APPLICATION PROGRAMS WITHOUT AN OPERATING SYSTEM

BACKGROUND OF THE INVENTION

A data processor can often run an operating system that allows the processor to "simultaneously" run multiple application programs, i.e., applications. For example, an Intel Pentium® processor can run a Microsoft Windows® operating system, which allows the processor to simultaneously run applications such as MS Word® (word processor), Netscape Navigator® (web browser), and Adobe Acrobat® (image reader). Specifically, because the processor can typically execute the code of only one application at a time—in this sense, "simultaneous" is a misnomer—the operating system controls the processor such that the processor executes the code of one application for a first time period, the code of another application for a second time period, and so on, and then repeats this sequence. Because the time periods are relatively small (typically on the order of milliseconds (ms)), it appears to a user that the processor is running more than one application at the same time, hence the term "simultaneous." The processor's execution of the code of one application and then the code of another application is often called context switching because the processor, under the control of the operating system, switches from running the one application to running the other application. Furthermore, the processor may facilitate context switching by the operating system. For example, the instruction set of the processor may include specialized context-switching instructions that the operating system can use to, e.g., save the data generated by one application before switching to the other application. Furthermore, the processor may include circuitry for handling interrupts that initiate a switch from one application to the other.

Similarly, in a data-processing circuit that includes multiple data processors, each processor can run a respective operating system that allows the processor or a group of cooperating processors to "simultaneously" run multiple applications in the above-described manner. Such a data-processing circuit is further described below in conjunction with FIG. 1.

Unfortunately, because a data processor typically cannot run multiple applications "simultaneously" without also running an operating system, a processor that operates in a stand-alone mode, i.e., without running an operating system, typically cannot run multiple applications "simultaneously".

FIG. 1 is a block diagram of a conventional data-processing circuit 10, which includes two processors 12 and 14 that run their own operating systems so that together they can run multiple applications "simultaneously". In addition to the cooperating processors 12 and 14, the circuit 10 includes memories 16 and 18. The memory 16 includes a section 22 and sections $24_1$–$24_n$ for respectively storing the code of the operating system and the code of the applications or portions of the applications run by the processor 12. The memory 16 also includes a section 26 for storing data generated by the processor 12 while it executes the operating-system and/or application code. Similarly, the memory 18 includes a section 28 and sections $30_1$–$30_n$ for respectively storing the code of the operating system and the code of the applications or portions of the applications run by the processor 14, and a section 32 for storing data generated by the processor 14.

In operation, the processors 12 and 14 cooperate to "simultaneously" run multiple applications programs, and are under the control of the operating systems stored in the memory sections 22 and 28, respectively, during all of the time periods discussed below.

During a first application-running period, the processor 12 executes a portion of the first-application code stored in the memory section $24_1$ and the processor 14 executes a portion of the first-application code stored in the memory section $30_1$. Although the processors 12 and 14 may execute the same portion of the first-application code, they typically cooperate more effectively by executing different portions of the code. For example, if the first application is an image-encoding program, then the processor 12 might execute a portion of the code that encodes image data and the processor 14 might execute a portion of the code that generates an encoded bit stream from the encoded image data. Consequently, to use memory efficiently when the processors 12 and 14 execute different portions of an application's code, the memory section $24_1$ may store only the portion of the code that is executed by the processor 12, and the memory section $30_1$ may store only the portion of the code that is executed by the processor 14. The processor 12 stores in the memory section 26 any data that it generates while executing its portion of the first-application code; likewise, the processor 14 stores in the memory section 32 any data that it generates while executing its portion of the first-application code.

During a context-switching period, the processors 12 and 14 prepare to switch from executing the respective portions of the first-application code stored in the memory sections $24_1$ and $30_1$ to executing respective portions of the second-application code stored in the memory sections $24_2$ and $30_2$. One or both of the operating systems respectively being run by the processors 12 and 14 initiate the context-switching period on its/their own or in response to a signal, such as an interrupt request, that one or both of the processors process. As a result of this initiation, the processor 12 performs one or more context-switching tasks such as loading its program counter (not shown) with a value that points to the memory section $24_2$. Also, if during subsequent time periods the processor 12 might overwrite the data it stored in the memory section 26 during the first application-running period, the processor saves this data to another memory location where it will not be overwritten. In addition, the processor 12 may restore to the memory section 26 data that it generated and saved during a prior execution of the application code—here the second-application code—that it is preparing to execute. Likewise, the processor 14 performs one or more such context-switching tasks such as loading its program counter (not shown) with a value that points to the memory section $30_2$, saving data from the memory section 32 to another memory location, and restoring previously saved data to the memory section 32. The context-switching period typically ends once the processors 12 and 14 have finished executing their context-switching tasks.

During a second application-running period, the processor 12 executes a portion of the second-application code stored in the memory section $24_2$ and the processor 14 executes a portion of the second-application code stored in the memory section $30_2$. As discussed above, although the processors 12 and 14 may execute the same portion of the second-application code, they typically cooperate more effectively by executing different portions of the code. For example, if the second application is an image-decoding program, then the processor 12 might execute a portion of the code that decodes image data and the processor 14 might execute a portion of the code that parses the received encoded bit stream. Consequently, to use memory efficiently, the memory section $24_2$ may store only the portion of the second-application code that is executed by the processor 12, and the memory section $30_2$ may store only the portion of the second-application code that is executed by the processor 14. The processor 12 stores in the memory section 26 any data that it generates while executing its portion of the second-application code; likewise, the processor 14 stores in the memory section 32 any data that it generates while executing its portion of the second-application code.

The processors 12 and 14 continue switching back and forth between the first and second applications (and any other applications that the processors 12 and 14 are simultaneously running) until instructed to stop. Furthermore, although not discussed, the processors 12 and 14 typically execute respective portions of the operating-system code during operating-system-running periods that occur between the application-running and context-switching periods discussed above.

Still referring to FIG. 1, the processors 12 and 14 typically incur relatively large levels of overhead to run the respective operating systems. Specifically, running an operating system typically requires a relatively large percentage of a processor's processing time and a large amount of random-access memory (RAM).

Consequently, to reduce or eliminate this operating-system overhead, it is sometimes desirable to run one or both of the processors 12 and 14 in a stand-alone mode. For example, running the processor 12 in a stand-alone mode often allows it to devote more of its processing time to the applications stored in the memory sections $24_1$–$24_n$ and frees up the memory section 22 to store another application or data. This technique is particularly useful if one of the applications is so time intensive that the processor 12 cannot run both the application and the operating system, or if the memory 16 is too small to hold an operating system and multiple applications.

But unfortunately, the processors 12 and 14 typically cannot run multiple applications "simultaneously" without also running respective operating systems and thus incurring the above-described operating-system overhead.

SUMMARY OF THE INVENTION

In one embodiment of the invention, a data-processing circuit includes first and second processors. The first processor is operable under the control of an operating system to switch back and forth between executing a first portion of a first application and executing a first portion of a second application. And the second processor is operable in a stand-alone mode to switch back and forth between executing a second portion of the first application and executing a second portion of the second application.

Such a data-processing circuit allows multiple processors to run multiple applications "simultaneously" while at least one of the processors is operating in a stand-alone mode to reduce or eliminate operating-system overhead.

In another embodiment of the invention, the first processor runs a single application but no operating system, and the second processor is operable in a stand-alone mode to switch back and forth between executing different portions of the single application, a portion of the single application and another application, or different applications.

Such a data-processing circuit allows multiple processors to run multiple applications or functions "simultaneously" with all of the processors operating in a stand-alone mode to further reduce or eliminate operating-system overhead.

DESCRIPTION OF THE INVENTION

The following discussion is presented to enable a person skilled in the art to make and use the invention. Various modifications to the disclosed embodiments will be readily apparent to those skilled in the art, and the generic principles herein may be applied to other embodiments and applications without departing from the spirit and scope of the present invention as defined by the appended claims. Thus, the present invention is not intended to be limited to the embodiments shown, but is to be accorded the widest scope consistent with the principles and features disclosed herein.

Figure 1:
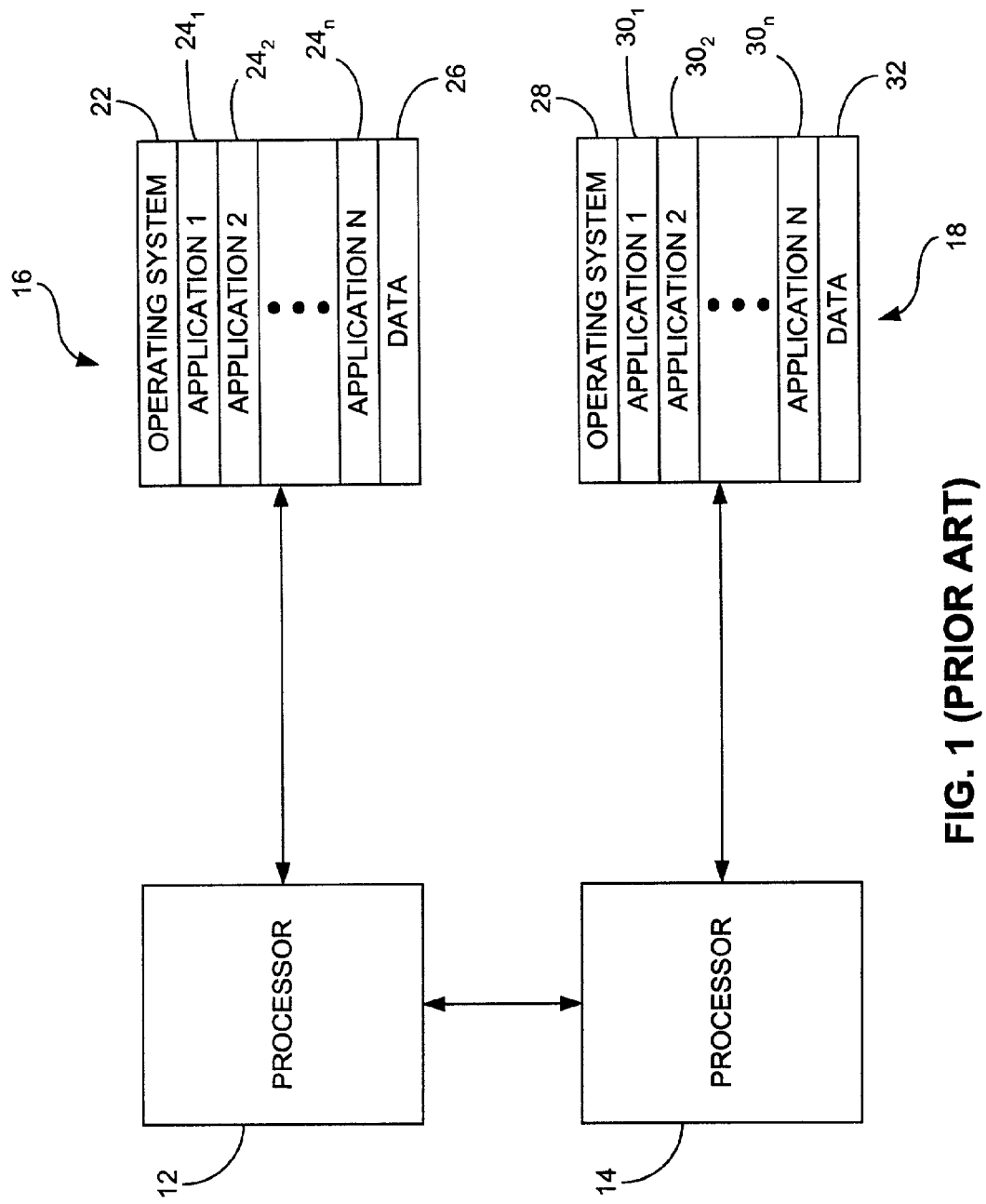
FIG. 1 is a block diagram of a data-processing circuit that operates in a conventional manner.
Figure 2:
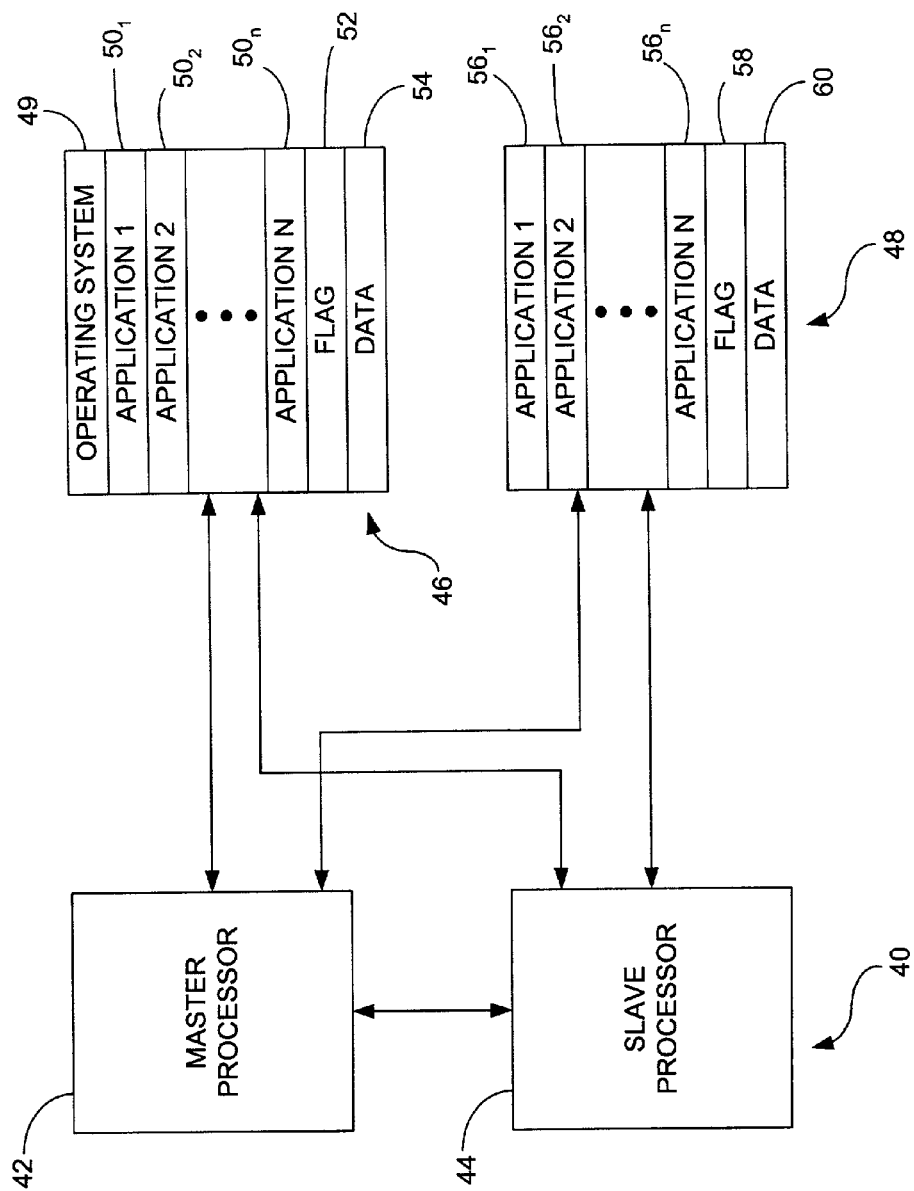
FIG. 2 is a block diagram of a data-processing circuit that operates according to an embodiment of the invention.

FIG. 2 is a block diagram of an integrated data-processing circuit 40, which includes two processors 42 and 44 that run multiple applications "simultaneously" according to an embodiment of the invention. The circuit 40 is similar to the data-processing circuit 10 of FIG. 1 except that one of the processors, the processor 44, operates in a stand-alone mode and is a slave to the master processor 42. By not running an operating system on the processor 44, the circuit 40 eliminates the overhead associated with running an operating system on this processor. Specifically, the processor 44 can devote more time to running applications, and the memory space that would otherwise store the operating-system code for the processor 44 can be used to store other code or data or can be eliminated to reduce the size, complexity, and/or cost of the circuit 40.

In addition to the processors 42 and 44, the data-processing circuit 40 includes memories 46 and 48. The memory 46 is coupled to the processors 42 and 44 and includes sections 49 and $50_1$–$50_n$ for respectively storing the operating-system code and the code of the applications or portions of the applications run by the processor 42, an optional flag section 52, and a section 54 for storing data generated by the processor 42. The memory 48 is coupled to the processors 42 and 44 and includes sections $56_1$–$56_n$ for respectively storing the code of the applications or portions of the applications run by the processor 44, an optional flag section 58, and a section 60 for storing data generated by the processor 44. Because the memory 48 does not store an operating system, it can often be smaller than the memory 46. Typically, the memories 46 and 48 are a type of RAM, such as Static RAM (SRAM), Dynamic RAM (DRAM), Synchronous DRAM (SDRAM), Double Data Rate RAM (DDRRAM), or Rambus® RAM although they can be other types of memory.

In operation, the processors 42 and 44 cooperate to "simultaneously" run multiple applications, and the processor 44 does so without the assistance of an operating system as discussed below. The processor 42, however, is under the control of the operating system stored in the memory sections 49 during all of the time periods discussed below.

During a first application-running period, the processor 42 executes a portion of the first-application code stored in the memory section $50_1$ and the processor 44 executes a portion of the first-application code stored in the memory section $56_1$. Although the processors 42 and 44 may execute the same portion of the first-application code, they typically cooperate more effectively by executing different portions of the code. Consequently, to use memory efficiently when the processors 42 and 44 execute different portions of the first-application code, the memory section $50_1$ may store only the portion of the first-application code that is executed by the processor 42, and the memory section $56_1$ may store only the portion of the first-application code that is executed by the processor 44. The processor 42 stores in the memory section 54 any data that the processor generates while executing its portion of the first-application code; likewise, the processor 44 stores in the memory section 60 any data that the processor generates while executing its portion of the first-application code.

During a first context-switching period, the processors 42 and 44 prepare to switch from executing the respective portions of the first-application code stored in the memory sections $50_1$ and $56_1$ to executing respective portions of another application's code—here the second-application code stored in the memory sections $50_2$ and $56_2$.

In one embodiment, the operating-system code executed by the master processor 42 initiates the context-switching period in both the processor 42 and the slave processor 44. For example, the operating system may cause the processor 42 to set flags in the memory sections 52 and 58, and the processors 42 and 44 enter the context-switching period in response to reading these respective flags. Or, the operating system may cause the processor 42 to set a single flag in the memory section 58 and to enter the context-switching period, and the processor 44 enters the context-switching period in response to reading the flag. Alternatively, the operating system may cause the processor 42 to begin context switching, and then the processor 42 may instruct the processor 44 to begin context switching. The operating system typically initiates the context-switching period in response to the occurrence of a predetermined event. For example, if the first application is a video-image encoder, then the operating system may initiate context switching when the processor 42 has encoded a complete video frame and the processor 44 has generated a corresponding encoded bit stream.

During the first context-switching period, the processors 42 and 44 perform one or more context-switching tasks under the control of the operating system run by the master processor 42. Typically, the operating system controls the master processor 42 directly, and controls the slave processor 44 via the master processor 42. For example, if during subsequent application-running periods the processor 42 might overwrite the data it stored in the memory section 54 during the first application-running period, the processor saves this data to another memory location where it will not be overwritten. In addition, the processor 42 may restore to the memory section 54 data that it generated and saved during a prior execution of the application code to be next executed. Lastly, the processor 42 typically loads its program counter (not shown) with an address that points to a memory section—the section $50_2$ in this embodiment—that stores the code of the next application program or the next portion of an application program to be run. Likewise, the processor 44 performs one or more context-switching tasks such as saving data from the memory section 60 to another memory location, restoring previously saved data to the memory section 60, and loading its program counter (not shown) with an address that points to a memory section— the memory section $56_2$ in this embodiment—that stores the code of the next application to be run. The context-switching period typically ends once the processors 42 and 44 have loaded their program counters with the new addresses.

During a second application-running period, the processor 42 executes a portion of the second-application code stored in the memory section $50_2$ and the processor 44 executes a portion of the second-application code stored in the memory section $56_2$. As discussed above, although the processors 42 and 44 may execute the same portion of the second-application code, they typically cooperate more effectively by executing different portions of the code. Consequently, to use memory efficiently, the memory section $50_2$ may store only the portion of the second-application code that is executed by the processor 42, and the memory section $56_2$ may store only the portion of the second-application code that is executed by the processor 44. The processor 42 stores in the memory section 54 any data that it generates while executing its portion of the second-application code; likewise, the processor 44 stores in the memory section 60 any data that it generates while executing its portion of the second-application code.

During a second context-switching period, the processors 42 and 44 prepare to switch from executing the respective portions of second-application code stored in the memory sections $50_2$ and $56_2$ to executing respective portions of another application's code stored in respective ones of the memory sections 50 and 56. In one embodiment, the operating system executed by the processor 42 initiates the second context-switching period in both processors 42 and 44. During this period, the processors 42 and 44 perform one or more context-switching tasks under the control of the operating system run by the processor 42 in a manner similar to that discussed above in conjunction with the first context-switching period.

The processors 42 and 44 continue switching back and forth between the first and second applications (and any other applications that the processors 42 and 44 are "simultaneously" running) in the manner described above until instructed to stop.

By not running an operating system, the processor 44 can devote more processing time to running the applications stored in the memory sections 56, and the memory 48 can often be smaller than the memories 16 and 18 (FIG. 1) and the memory 46 because the memory 48 need not store an operating system.

Still referring to FIG. 2, other embodiments of the data-processing circuit 40 are contemplated. For example, the processor 44 can be the master and the processor 42 the slave such that an operating system run on the processor 44 can initiate and control the switching between applications while the processor 42 runs in a stand-alone mode. Furthermore, the processor 42 (or the processor 44) may set the flag in only one memory section 52 or 58, and the processors 42 and 44 can both read the flag from this common memory location. Moreover, although the data-processing circuit 40 is described as an integrated circuit, one or more of the processors 42 and 44 and the memories 46 and 48 may be discrete integrated circuits. In addition, the memory 48 may store an operating system that the processor 44 does not run. Furthermore, although described as running different portions of the same application at the same time, the processors 42 and 44 and may run different applications at the same time. Moreover, the circuit 40 may include more than two slave processors where one or more master processors control the context switching of all the slaves.

Figure 3:
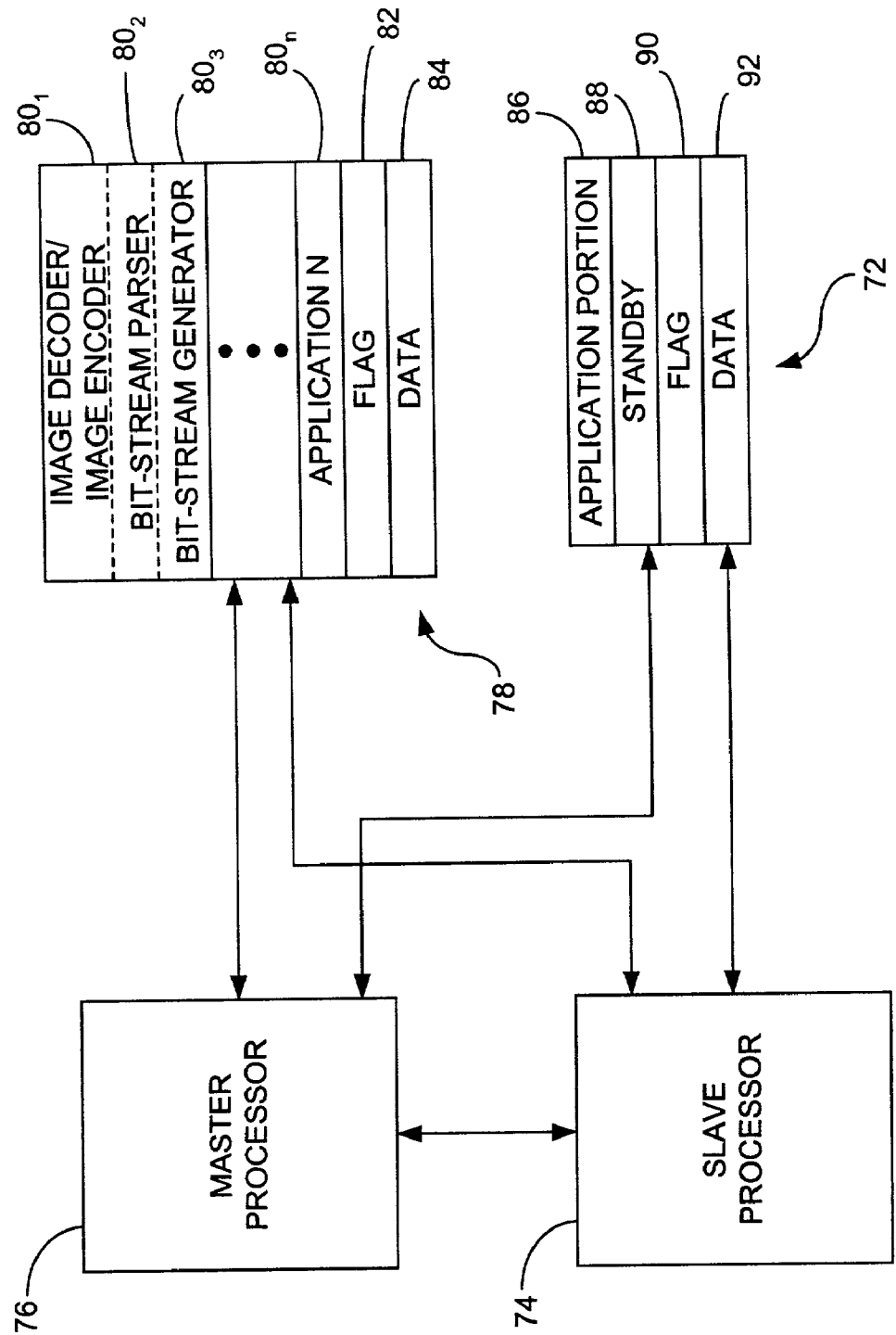
FIG. 3 is a block diagram of a data-processing circuit that operates according to another embodiment of the invention.

FIG. 3 is a block diagram of an integrated data-processing circuit 70 that can run multiple applications, multiple portions of a single application, and/or combination of applications and application portions "simultaneously" according to another embodiment of the invention. The circuit 70 is similar to the data-processing circuit 40 of FIG. 2 except that the memory 72 for the slave processor 74 stores the code for only one application or application portion at a time, and the master processor 76 runs a single application or application portion but no operating system. Therefore, during a context-switching period, the master processor 76 loads the appropriate application code into the memory 72 as discussed below. By not running an operating system on the processor 76, the circuit 70 eliminates the overhead associated with running an operating system. Specifically, the processor 76 can devote more time to running its application, and the memory space that would otherwise store the operating-system code for the processor 76 can be used to store other code or data or can be eliminated to reduce the size, complexity, and/or the cost of the circuit 70.

In addition to the memory 72 and the processors 74 and 76, the data-processing circuit 70 includes a memory 78. The memory 78 is coupled to the processors 74 and 76 and includes sections $80_1$–$80_n$ for respectively storing the application or portion of the application run by the processor 76 and the applications and/or portions of the applications run by the processor 74, an optional flag section 82, and a section 84 for storing data generated by the processor 76. The memory 72 is coupled to the processors 74 and 76 and includes a single section 86 for storing the code of the application or portion of the application being run by the processor 74, a standby-code section 88, an optional flag section 90, and a section 92 for storing data generated by the processor 74.

In operation, the processors 74 and 76 cooperate to run multiple applications, multiple portions of a single application, and/or a combination of applications and application portions "simultaneously" without the assistance of an operating system as discussed below. For purposes of discussion, assume that the memory section $80_1$ stores an image decoder/encoder application, the memory section $80_2$ stores a bit-stream parser application, and the memory section $80_3$ stores a bit-stream generator application. Also assume that initially, the bit-steam parser is also stored in the section 86 of the memory 72. By combining the encoder and decoder functions into a single application and making the bit-stream generator and bit-stream parser separate applications, the master processor 76 can run the image decoder/encoder and control the context switching of the slave processor 74 between the bit-stream generator and bit-stream parser without running an operating system.

During an image-decode period, the processor 76 runs the decoding portion of the image decoder/encoder application stored in the memory section $80_1$ and the processor 74 runs the bit-stream parser stored in the memory section 86. Specifically, the processor 74 parses an encoded bit stream and stores the parsed bit stream in the memory section 92. The processor 76 receives the parsed bit stream from the section 92, decodes the image data that the parsed bit stream contains, and then loads the decoded image data into the memory section 84.

During a first context-switching period, the slave processor 74 prepares to switch from executing the bit-stream parser to executing the bit-stream generator. Also, the master processor 76 prepares to stop executing the decoding portion of the image decoder/encoder application and to begin executing the encoding portion of the image decoder/encoder. But because the processor 76 is still running the same application and is not switching between applications only the processor 74 undergoes a true context switch.

The decoding portion of the image decoder/encoder application run by the master processor 76 initiates the context switching in the slave processor 74. For example, the decoding portion may cause the processor 76 to set flags in the memory sections 82 and 90, and the processors 74 and 76 enter the context-switching period in response to reading these respective flags. Or, the decoding portion may cause the processor 76 to set a single flag in the memory section 90 and to begin run to execute the encoding portion of the image decoder/encoder, and the processor 74 enters the context-switching period in response to reading the flag. Alternatively, the decoding portion of the image decoder/encoder may cause the master processor 76 to begin preparing to execute the encoding portion of the image decoder/encoder, and then the processor 76 may instruct the slave processor 74 to begin context switching under the control of the processor 76. The decoding portion of the image decoder/encoder typically initiates the context-switching period in response to the processor 76 having decoded a predetermined amount of data such as a complete video frame.

During the context-switching period and under the control of the decoding portion of the image decoder/encoder application stored in the memory section $80_1$, the processor 74 performs one or more tasks in preparation of running the encoding portion of the image decoder/encoder and the processor 76 performs one or more context-switching tasks. Specifically, the processor 76 instructs the processor 74 to enter an idle programming loop by executing the standby code stored in the memory section 88. Next, the processor 76 saves the data in the memory section 82 that it may need during subsequent decoding periods to another memory location where this data will not be overwritten. In addition, the processor 76 may restore to the memory section 82 data that it generated and saved during a prior running of the encoding portion of the image decoder/encoder to be executed next. Then, the processor 76 saves the data in the memory section 92 that the processor 74 may need during subsequent decoding periods to another memory location where this data will not be overwritten. Next, the processor 76 loads the bit-stream generator from the memory section $80_3$ into the memory section 86. During these latter two steps, the processor 76 may initiate a hand-shake protocol with the processor 74 to determine when all of the data has been saved and when the bit-stream generator has been completely loaded. To end the context-switching period, the processor 76 causes the processor 74 to end execution of the standby code, begins executing the encoding portion of the image decoder/encoder stored in the memory section $80_1$, and causes the processor 74 to begin executing the bit-stream generator stored in the memory section 86.

During an image-encode period, the processor 76 executes the encoding portion of the image decoder/encoder stored in the memory section $80_1$ and the processor 74 executes the bit-stream generator stored in the memory section 86. Specifically, the processor 76 encodes video data and stores the encoded video data in the memory section 84. The processor 74 transforms the encoded video data from the section 84 into an encoded bit stream and loads the bit stream into the memory section 92.

During a second context-switching period, the slave processor 74 prepares to switch from executing the bit-stream generator to executing the bit-stream parser. Also, the master processor 76 prepares to stop executing the encoding portion of the image decoder/encoder application and to begin executing the decoding portion of the image decoder/encoder. But because the processor 76 is still running the same application and is not switching between applications, only the processor 74 undergoes a true context switch.

The encoding portion of the image decoder/encoder application run by the master processor 76 initiates the context switching in the slave processor 74. For example, the encoding portion of the image decoder/encoder may cause the processor 76 to set flags in the memory sections 82 and 90, and the processors 74 and 76 enter the second context-switching period in response to reading these respective flags. Or, the encoding portion may cause the processor 76 to set a single flag in the memory section 90 and to begin preparing to run the decoding portion of the image decoder/encoder, and the processor 74 enters the context-switching period in response to reading the flag. Alternatively, the encoding portion of the image decoder/encoder may cause the master processor 76 to begin preparing to run the decoding portion of the image decoder/encoder, and then the processor 76 may instruct the slave processor 74 to begin context switching. The encoding portion of the image decoder/encoder typically initiates the second context-switching period in response to the processor 76 having encoded a predetermined amount of data such as a complete video frame.

During the second context-switching period and under the control of the encoding portion of the image decoder/encoder application stored in the memory section $80_1$, the master processor 76 performs one or more tasks in preparation of running the decoding portion of the image decoder/encoder and the slave processor 74 performs one or more context-switching tasks. Specifically, the processor 76 instructs the processor 74 to enter the idle programming loop by executing the standby code stored in the memory section 88. Next, the processor 76 saves the data in the memory section 82 that it may need during subsequent encoding periods to another memory location where this data will not be overwritten. In addition, the processor 76 may restore to the memory section 82 data that it generated and saved during a prior execution of the decoding portion of the image decoder/encoder to be executed next. Then, the processor 76 saves the data in the memory section 92 that the processor 74 may need during subsequent encoding periods to another memory location where this data will not be overwritten. Next, the processor 76 loads the bit-stream parser from the memory section $80_2$ into the memory section 86. During these latter two steps, the processor 76 may initiate a hand-shake protocol with the processor 74 to determine when all of the data has been saved and when the bit-stream parser has been completely loaded. To end the second context-switching period, the processor 76 causes the processor 74 to end execution of the standby code, begins executing the decoding portion of the image decoder/encoder stored in the memory section $80_1$, and causes the processor 74 to begin executing the bit-stream parser stored in the memory section 86.

The processors 74 and 76 continue this decode, context-switch, encode, context-switch cycle until instructed to stop.

Still referring to FIG. 3, other embodiments of the data-processing circuit 70 are contemplated. For example, the order of the steps that the master processor 76 performs during the first and second context-switching periods may be altered. Furthermore, the above-described image decoder/encoder, bit-stream parser, and bit-stream generator applications may respectively, decode and encode, parse, and generate image data according to an MPEG standard. In addition, the processors 74 and 76 may run other applications and/or portions of applications instead of the image decoder/encoder, parser, and generator applications. Moreover, the circuit 70 may be a MAP processing circuit manufactured by Equator, Inc. of Campbell, Calif., U.S.A. In such an embodiment, the master processor 76 is the MAP's core processor, the slave processor 74 is the MAP's VLx processor, and the memory 72 has a size of 8 KiloBytes (KB). An example of the MAP processing circuit is discussed in U.S. patent application Ser. No. 09/750,383, Publication No. US-2002-0011943-A1, titled PROCESSING CIRCUIT AND METHOD FOR VARIABLE-LENGTH CODING AND DECODING, filed Dec. 21, 2000, which is incorporated by reference. Furthermore, instead of running different applications stored in the memory sections $80_1$–$80_n$, the processors 74 and 76 may run different portions of the same application stored in these memory sections. For example, the image decoder/encoder, bit-stream parser, and bit-stream generator stored in the memory sections $80_1$–$80_3$ may be portions of a single image decode/encode application. In addition, other embodiments similar to those discussed above for the circuit 40 (FIG. 2) are also contemplated.

Figure 4:
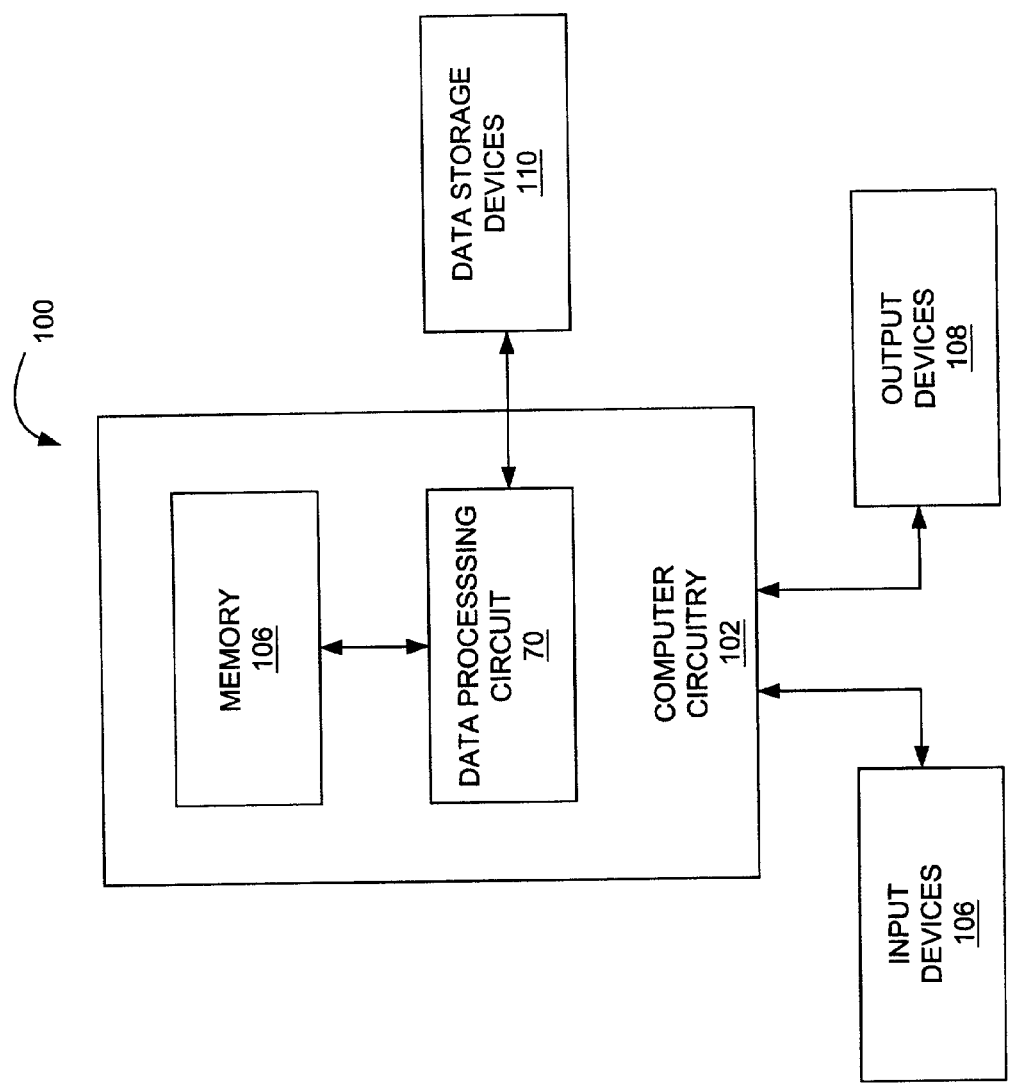
FIG. 4 is a block diagram of an electronic system that can incorporate one or more of the data-processing circuits of FIGS. 2–3 according to an embodiment of the invention.

FIG. 4 is a block diagram of an electronic system 100, such as a computer system, that incorporates the data-processing circuit 40 (FIG. 2), the data-processing circuit 70 (FIG. 3), or both the circuits 40 and 70 according to an embodiment of the invention. But for example purposes, the system 100 is shown incorporating the circuit 70. The system 100 includes computer circuitry 102 for performing computer functions, such as executing software to perform desired calculations and tasks. The circuitry 102 includes the circuit 70, and may include additional memory 106, which is coupled to the circuit 70, and additional processors (not shown). One or more input devices 106, such as a keyboard or a mouse, are coupled to the computer circuitry 102 and allow an operator (not shown) to manually input data thereto. One or more output devices 108 are coupled to the computer circuitry 102 to provide to the operator data generated by the computer circuitry 102. Examples of such output devices 108 include a printer and a video display unit. One or more data-storage devices 110 are coupled to the computer circuitry 102 to store data on or retrieve data from external storage media (not shown). Examples of the storage devices 110 and the corresponding storage media include drives that accept hard and floppy disks, tape cassettes, and compact disk read-only memories (CD-ROMs).

We claim:

1. A data processing circuit, comprising:
a first memory operable to store an operating system and first portions of first and second application programs;
a second memory operable to store second portions of the first and second application programs;
a first processor coupled to the first memory and operable to switch back and forth between executing the first portions of the first and second application programs under the control of the operating system; and
a second processor coupled to the second memory and operable in a stand alone mode to switch back and forth between executing the second portions of the first and second application programs
where the operating system is adapted to initiate the first processor's back and forth switching between executing the first portions of the first and second applications and the second processor's back and forth switching between executing the second portions of the first and second applications responsive to a predetermined event.

2. The data processing circuit of claim 1 wherein:
the first processor is operable to switch from executing the first portion of the first application program to executing the first portion of the second application program in response to the operating system and is operable to switch from executing the first portion of the second application program to executing the first portion of the first application program in response to the operating system; and
the second processor is operable to switch from executing the second portion of the first application program to executing the second portion of the second application program in response to the first processor and is operable to switch from executing the second portion of the second application program to executing the second portion of the first application program in response to the first processor.

3. The data processing circuit of claim 1 wherein:
the first processor is operable to generate first data as it executes the first portion of the first application program and/or the first portion of the second application program;
the first memory is operable to store the first data;
the second processor is operable to generate second data as it executes the second portion of the first application program and/or the second portion of the second application program; and
the second memory is operable to store the second data.

4. The data processing circuit of claim 1 wherein:
the first portion of the first application program is the same as the second portion of the first application program; and
the first portion of the second application program is the same as the second portion of the second application program.

5. The data-processing circuit of claim 4 wherein:
the first portion of the first application program composes the entire first application program; and
the first portion of the second application program composes the entire second application program.

6. The data processing circuit of claim 1 wherein:
the operating system is operable to cause the first processor to set an application switch flag;
the first processor is operable to switch from executing the first portion of the first application program to the first portion of the second application program in response to the operating system and to switch from executing the first portion of the second application program to the first portion of the first application program in response to the operating system; and
the second processor is operable to switch from executing the second portion of the first application program to the second portion of the second application program in response to the application switch flag and to switch from executing the second portion of the second application program to the second portion of the first application program in response to the application switch flag.

7. The data processing circuit of claim 1 wherein:
the first processor is operable to end execution of the first portion of the first application program before executing the first portion of the second application program; and
the second processor is operable to end execution of the second portion of the first application program before executing the second portion of the second application program.

8. A data processing circuit, comprising:
a first memory operable to store an application program having first, second, and third portions;
a second memory operable to store one of the portions of the application program at a time;
a first processor coupled to the first memory and operable to execute the first portion of the application program and to alternately load the second and third portions of the application program into the second memory; and
a second processor coupled to the first processor and to the second memory and operable in a stand alone mode and to execute the second portion of the application program and to begin executing the third portion of the application program in response to the first portion of the application program;
where, during a first context switching period, the first processor is operable to load a bit stream generator from the first memory to the second memory and to cause the second processor to execute the bit stream generator in the second memory; and
where, during a second context switching period, the first processor is operable to load a bit stream parser from the first memory to the second memory and to cause the second processor to execute the bit stream parser in the second memory.

9. The data processing circuit of claim 8 wherein the first and second processors are each inoperable to execute an operating system program.

10. The data processing circuit of claim 8 wherein the second processor is inoperable to simultaneously execute the second and third portions of the application program.

11. The data processing circuit of claim 8 wherein after the second processor begins executing the second portion of the application program, the second processor is operable to begin executing the third portion of the application program in response to the first portion of the application program.

12. The data processing circuit of claim 8 wherein the second processor is operable to begin executing the second portion of the application program in response to the first processor.

13. A data processing circuit, comprising:
a first memory operable to store first, second, and third application programs;
a second memory operable to store one of the application programs at a time;
a first processor coupled to the first memory and operable to execute the first application program and to alternately load the second and third application programs into the second memory; and
a second processor coupled to the first processor and to the second memory and operable in a stand alone mode and to execute the second application program and to begin executing the third application program in response to the first application program;
where, during a first context switching period, the first processor is operable to load a bit stream generator from the first memory to the second memory and to cause the second processor to execute the bit stream generator in the second memory: and
where, during a second context switching period, the first processor is operable to a bit stream parser from the first memory to the second memory and to cause the second processor to execute the bit stream parser in the second memory.

14. The data processing circuit of claim 13 wherein the first and second processors are each inoperable to execute an operating system program.

15. The data processing circuit of claim 13 wherein the second processor is inoperable to simultaneously execute the second and third application programs.

16. The data processing circuit of claim 13 wherein after the second processor begins executing the second application program, the second processor is operable to begin executing the third application program in response to the first application program.

17. The data processing circuit of claim 13 wherein the second processor is operable to begin executing the second application program in response to the first processor.

18. A data processing circuit, comprising:
a master memory operable to store first, second, and third portions of an application program;
a slave memory;
a slave processor coupled to the slave memory; and
a master processor coupled to the master memory and the slave processor and operable to:
execute the first portion of the application program while the slave processor executes the second portion of the application program from the slave memory and stores in the slave memory second portion slave data,
cause the slave processor to end execution of the second portion of the application program and to enter an idle programming loop by executing a standby program,
save the second portion slave data from the slave memory into the master memory while the slave processor executes the standby program,
load the third portion of the application program from the master memory into the slave memory while the slave processor executes the stand by program,
cause the slave processor to end execution of the standby program and to execute the third portion of the application program stored in the slave memory and to store in the slave memory third portion slave data, and
continue executing the first portion of the application program while the slave processor executes the third portion of the application program stored in the slave memory.

19. The data processing circuit of claim 18 wherein:
the first portion of the application program comprises image coding/decoding code;
the second portion of the application program comprises a bit stream generator; and
the third portion of the application program comprises a bit stream parser.

20. The data processing circuit of claim 18 wherein the slave processor is inoperable to simultaneously execute the second and third portions of the application program.

21. The data processing circuit of claim 18 wherein the master processor is coupled to the slave memory.

22. The data processing circuit of claim 18 wherein:
the master processor comprises a MAP core processor; and
the slave processor comprises a MAP VLx processor.

23. The data processing circuit of claim 18 wherein the master processor is operable to save the second portion slave data into the master memory before loading the third portion of the application program into the slave memory.

24. The data processing circuit of claim 18 wherein the master processor is operable to save the second portion slave data into the master memory after loading the third portion of the application program into the slave memory.

25. The data processing circuit of claim 18 wherein the master processor and the slave processor are operable in respective stand alone modes.

26. The data processing circuit of claim 18 wherein the first portion of the application program causes the master processor to cause the slave processor to end execution of the second portion of the application program.

27. A data processing circuit comprising:
a master memory operable to store first, second, and third portions of an application program;
a slave memory;
a slave processor coupled to the slave memory; and
a master processor coupled to the master memory and the slave processor and operable to:
execute the first portion of the application program while the slave processor executes the second portion of the application program from the slave memory and stores in the slave memory second portion slave data;
cause the slave processor to end execution of the second portion of the application program and to execute a standby program;
save the second portion slave data from the slave memory into the master memory while the slave processor executes the standby program;
load the third portion of the application program from the master memory into the slave memory while the slave processor executes the stand by program;
cause the slave processor to end execution of the standby program and to execute the third portion of the application program stored in the slave memory and to store in the slave memory third portion slave data;
continue executing the first portion of the application program while the slave processor executes the third portion of the application program stored in the slave memory;
cause the slave processor to end execution of the third portion of the application program and to execute the standby program;
save the third portion slave data from the slave memory into the master memory while the slave processor executes the standby program;
load the second portion of the application program from the master memory into the slave memory while the slave processor executes the standby program;
load the stored second portion data from the master memory into the slave memory while the slave processor executes the standby program;
cause the slave processor to end execution of the standby program and to execute the second portion of the application program stored in the slave memory and to store in the slave memory new second portion slave data; and
continue executing the first portion of the application program while the slave processor executes the second portion of the application program stored in the slave memory.

28. An electronic system, comprising:
a data input device;
a data output device; and
data processing circuit coupled to the data input and data output devices and comprising
a first memory operable to store an operating system and first portions of first and second application programs;
a second memory operable to store second portions of the first and second application programs;
a first processor coupled to the first memory and operable to switch back and forth between executing the first portions of the first and second application programs under the control of the operating system; and a second processor coupled to the second memory and operable in a stand alone mode and to switch back and forth between executing the second portions of the first and second application programs;

where the operating system is adapted to initiate the first processor's back and forth switching between executing the first portions of the first and second applications and the second processor's back and forth switching between executing the second portions of the first and second applications responsive to a predetermined event.

29. An electronic system, comprising:

a data input device;

a data output device; and data processing circuit coupled to the data input and data output devices and comprising a first memory operable to store an application program having first, second, and third portions;

a second memory operable to store one of the portions of the application program at a time;

a first processor coupled to the first memory and operable to execute the first portion of the application program and to alternately load the second and third portions of the application program into the second memory; and a second processor coupled to the first processor and to the second memory and operable in a stand alone mode and to execute the second portion of the application program and to begin executing the third portion of the application program in response to the first portion of the application program;

where, during a first context switching period, the first processor is operable to load a bit stream generator from the first memory to the second memory and to cause the second processor to execute the bit stream generator in the second memory; and where, during a second context switching period, the first processor is operable to a bit stream parser from the first memory to the second memory and to cause the second processor to execute the bit stream parser in the second memory.

30. An electronic system, comprising:

a data input device;

a data output device; and data processing circuit coupled to the data input and data output devices and comprising a master memory operable to store first, second, and third portions of an application programs;

a slave memory;

a slave processor coupled to the slave memory; and a master processor coupled to the master memory and the slave processor and operable to:

execute the first portion of the application program while the slave processor executes the second portion of the application program from the slave memory and stores in the slave memory second portion slave data, cause the slave processor to end execution of the second portion of the application program and to execute a standby program, save the second portion slave data from the slave memory into the master memory while the slave processor executes the standby program, load the third portion of the application program from the master memory into the slave memory while the slave processor executes the standby program, cause the slave processor to end execution of the standby program and to execute the third portion of the application program stored in the slave memory and to store in the slave memory third portion slave data, and continue executing the first portion of the application program while the slave processor executes the third portion of the application program stored in the slave memory.

31. A method, comprising:

executing a first portion of an application program with a master processor while a slave processor executes a second portion of the application program and generates second portion slave data;

ending execution of the second portion of the application program;

entering an idle programming loop by executing a standby program with the slave processor after ending execution of the second portion of the application program;

saving the second portion slave data while the slave processor executes the standby program;

loading a third portion of the application program into slave memory while the slave processor executes the standby program;

ending execution of the standby program;

executing the third portion of the application program with the second processor after ending execution of the standby program; and executing the first portion of the application program with the master processor while the slave processor executes the third portion of the application program.

32. The method of claim 31 wherein:

the first portion of the application program comprises an image coder/decoder;

the second portion of the application program comprises a data stream generator; and the third portion of the application program comprises a data stream parser.

33. The method of claim 31 wherein: the master processor comprises a MAP core processor; and the slave processor comprises a MAP VLx processor.

34. The method of claim 31, further comprising operating the master and slave processors in respective stand alone modes.

35. A method comprising:

executing a first portion of an application program with a master processor while a slave processor executes a second portion of the application program and generates second portion slave data;

ending execution of the second portion of the application program;

executing a standby program with the slave processor after ending execution of the second portion of the application program;

saving the second portion slave data while the slave processor executes the standby program;

loading a third portion of the application program into slave memory while the slave processor executes the standby program;

ending execution of the standby program;

executing the third portion of the application program with the second processor after ending execution of the standby program;

executing the first portion of the application program with the master processor while the slave processor executes the third portion of the application program;

generating third portion data with the slave processor while the slave processor executes the third portion of the application program;

ending execution of the third portion of the application program;

executing the standby program with the slave processor after ending execution of the third portion of the application program;

saving the third portion data while the slave processor executes the standby program;

loading the second portion of the application program into the slave memory while the slave processor executes the standby program;

loading the stored second portion data into the slave memory while the slave processor executes the standby program;

ending execution of the standby program;

executing the second portion of the application program with the slave processor after ending execution of the standby program; and executing the first portion of the application program while the slave processor executes the second portion of the application program.

* * * * *

UNITED STATES PATENT AND TRADEMARK OFFICE
CERTIFICATE OF CORRECTION

| | | |
|---|---|---|
| PATENT NO. | : 7,137,121 B2 | Page 1 of 1 |
| APPLICATION NO. | : 10/126353 | |
| DATED | : November 14, 2006 | |
| INVENTOR(S) | : Peter S. Gorgone et al. | |

It is certified that error appears in the above-identified patent and that said Letters Patent is hereby corrected as shown below:

On the cover page, in the References Cited (section 56), the kind code for U.S. Patent No. 6,507,293, issued January of 2003 to Deeley et al. is listed as "B1" and should be replaced with --B2--;

Column 12, line 59, the words "memory: and" should be replaced with --memory; and--;

Column 14, line 5, the words "circuit comprising:" should be replaced with --circuit, comprising:--.

Signed and Sealed this

Eighth Day of April, 2008

JON W. DUDAS
*Director of the United States Patent and Trademark Office*